(12) United States Patent
Keramidas et al.

(10) Patent No.: US 9,110,814 B2
(45) Date of Patent: Aug. 18, 2015

(54) DEVICE AND METHOD FOR ELIMINATING COMPLEX OPERATIONS IN PROCESSING SYSTEMS BASED ON CACHING

(71) Applicant: Think Silicon Ltd, Patras (GR)

(72) Inventors: Georgios Keramidas, Patras (GR); Iakovos Stamoulis, Patras (GR); Chrysa Kokkala, Patras (GR); George Sidiropoulos, Patras (GR)

(73) Assignee: THINK SILICON LTD, Patras (GR)

( * ) Notice: Subject to any disclaimer, the term of this patent is extended or adjusted under 35 U.S.C. 154(b) by 230 days.

(21) Appl. No.: 14/014,680

(22) Filed: Aug. 30, 2013

(65) Prior Publication Data

US 2015/0067261 A1  Mar. 5, 2015

(51) Int. Cl.
*G06F 12/08* (2006.01)
*G06F 9/302* (2006.01)
*G06F 9/45* (2006.01)
*G06F 9/30* (2006.01)

(52) U.S. Cl.
CPC .............. *G06F 12/0875* (2013.01); *G06F 8/52* (2013.01); *G06F 9/30007* (2013.01); *G06F 12/0862* (2013.01)

(58) Field of Classification Search
CPC ... G06F 12/0875; G06F 8/52; G06F 9/30007; G06F 9/30069; G06F 9/30079
See application file for complete search history.

(56) References Cited

U.S. PATENT DOCUMENTS

| | | | |
|---|---|---|---|
| 5,774,386 A | 6/1998 | Pawle | |
| 6,553,394 B1* | 4/2003 | Perry et al. | 708/200 |
| 6,810,474 B1* | 10/2004 | Miki | 712/216 |
| 7,730,263 B2* | 6/2010 | Burtscher et al. | 711/137 |
| 2002/0152368 A1* | 10/2002 | Nakamura | 712/226 |
| 2011/0302371 A1* | 12/2011 | Lysko | 711/118 |
| 2012/0096448 A1* | 4/2012 | Doyle | 717/159 |
| 2013/0073837 A1* | 3/2013 | Li et al. | 712/222 |
| 2013/0074057 A1* | 3/2013 | Gounares et al. | 717/152 |

OTHER PUBLICATIONS

Kamimura et al. ("A Speed-up Technique for an Auto-Memoization Processor by Reusing Partial Results of Instruction Regions," 978-0-7695-4893-7/12, IEEE, Dec. 5-7, 2012, Third International Conference on Networking and Computing, pp. 49-57).*

* cited by examiner

*Primary Examiner* — Hal Schnee
(74) *Attorney, Agent, or Firm* — Jason H. Vick; Sheridan Ross, PC

(57) ABSTRACT

The technology described in this application relates generally to computing processing systems and more specifically relates to systems that process data with resource intensive operations. Method and apparatus to lower the power consumption of the resource intensive operations are disclosed. Code analysis methods and run-time apparatus are presented that may eliminate the redundant operations (either complex calculations, memory fetches, or both). The techniques presented in this application are driven by special instructions inserted in the software code of the executing computer programs during the code generation process. Code analysis methods to insert the special instructions into the appropriate points in the source code of the target executing computer programs are presented. Run-time hardware mechanisms to support the potential elimination of redundant operations are also presented. Corresponding methods that might increase the number of eliminated operations by allowing limited errors to occur are also disclosed.

19 Claims, 10 Drawing Sheets

DEVICE AND METHOD FOR ELIMINATING COMPLEX OPERATIONS IN PROCESSING SYSTEMS BASED ON CACHING

STATEMENT REGARDING FEDERALLY SPONSORED RESEARCH OR DEVELOPMENT

Work that led to the development of this invention, was co-financed by Hellenic Funds and by the European Regional Development Fund (ERDF) under the Hellenic National Strategic Reference Framework (NSRF) 2007-2013, according to Contract no. MICRO2-035 of the Project "E-IV-ThinkSilicon" within the Programme "Hellenic Technology Clusters in Microelectronics—Phase-2 Aid Measure".

FIELD OF THE APPLICATION

The present application relates generally to value reuse techniques and particularly to techniques that may eliminate redundant evaluation of complex operations (for example, complex arithmetic expressions, or memory fetches, or both).

As it is known in the art, other terms that are commonly used for "value reuse" include value memorization (or simply memorization), value memorization (or simply memorization), and function caching (this particular term is used when the value cache technique is performed for storing results of function applications). The term value reuse will be used herein for convenience, but it should be understood that this term is intended to encompass all alternative and equivalent terms and techniques.

As it is known by those skilled in the art, value reuse techniques eliminate the redundant evaluation of arithmetic expressions or the redundant memory operations. A dedicated storage area in a nearby or high speed memory is required to save the output results of a particular instruction, a group of instructions, or a complete software function. When evaluating the particular instructions, the group of instructions, or the complete software functions for or at a given set of input parameters, this dedicated storage area is first checked to find out if the output results are saved in this area. If this is the case (a hit occurs in the dedicated storage area), the output results are immediately retrieved from the dedicated storage area and used by the software program. If the output results for the given set of input parameters are not in the said storage area, the output results are calculated (as it would normally happen in a system without the technology provided in this application), then the output results are stored in the dedicated storage area for future uses.

In the present application, the applicants will use the term "value cache" to refer to and acknowledge this dedicated storage area. The applicants do know that other related terms may exist or invented in the future, but it should be understood that the term "value cache" is intended to encompass all alternative implementations and equivalent terms that refer to a storage area which functions as already described in the current application and as it will be further described below. The applicants would also like to clarify that without loss of generality, in all the embodiments disclosed in this application, it is assumed that the value cache is implemented as a separate software controlled on-chip memory (either an SRAM or an embedded DRAM), but different arrangements are also possible. For example, the value cache can be implemented as part of a general purpose scratchpad memory, or as part of the general purpose register file(s), or, in general, using a part or the whole local store on-chip memories usually present in computing systems.

Conceptually, the value cache functions as a lookup table which internally maps between a set of output results (e.g., the data itself) and a set of input parameters (e.g., an address or an identifier(s) of the stored output data). Once the data is stored in the value cache, it may be accessed and retrieved more quickly than by fetching or calculating the original results from the original source input parameters. The value reusing technique therefore, if it is successfully employed, saves time and electrical power consumption by storing a limited volume of frequently accessed data in the value cache storage area.

In general, the value reuse technique applies the theory of cache to programming, logical, and numerical level. For example instead of recalculating the results of a function or a code segment, a previously calculated result can be used when the input parameters are the same. As it can be recognized by those skilled in the art, the value reuse technique finds particular application in computer applications which calculate memory-intensive or processor intensive operations, like the graphics processing applications intended to render three-dimensional (3-D) graphics data.

The various methods and circuits disclosed herein provide a novel approach to the usage of the value reuse technique. Although the embodiments described herein are generally illustrated in the more specific context of rendering of 3-D graphics data, those skilled in the art will appreciate the broader applicability of these techniques to general-purpose applications and systems. Furthermore, although several of the value reuse techniques described herein are discussed with respect to a particular processing stage or type of graphics data, such as the pixel level shading operations (also known as pixel or fragment shaders) discussed below, those skilled in the art will appreciate that many of the disclosed embodiments may be applied in other stages and/or to other graphics data such as the vertex level graphics operations.

BACKGROUND AND PRIOR ART

Value reuse is an optimization process that eliminates redundant calculations or memory operations in a computer program by caching the output results of previous executions of complex instructions, a group of instructions, or even software functions. In cases where the value reuse technique is successful (the sought results do exist in the value cache), the value reuse technique may drastically reduce computation time and electrical power consumption of the target computer system by only performing a specific operation at a time (for example the value lookup operation).

However, as it can be recognized by those skilled in the art, the value reuse technique may add time and electrical power consumption overheads to a computer program and system. The overheads may include testing the value cache prior to executing the target instructions, groups of target instructions or target software functions plus the overheads of storing and retrieving the results. In other words, the potential benefits of a value reuse mechanism not only depend on the number of instances it has eliminated, but, inter alia, on the time and electrical power spent in detecting the instances to be eliminated.

The technology disclosed in this application targets to increase the payback (measured either in terms of electrical power savings, or as performance improvements, or both) from utilizing value reuse techniques especially in the context of graphics applications rendering 3-D data. The applicants believe therefore that there remains scope for improvements to value reuse techniques and similar operations in graphics processing systems. Thereby, it is desirable to provide new methods and apparatus (according to the technology disclosed in the present invention) for facilitating further electrical power savings and performance improvements when value reuse techniques are employed.

There have been proposed several disclosed methods that utilizing the value reuse technique for performance improvements. For example US2013/0073837, US2013/0074057, and US2011/0302371, where the applicants apply the value reuse technique at the boundaries of the application source code functions and they try to optimize the performance payback by statically selecting the most appropriate functions to perform memorization and by memorizing and reusing the results of the most frequently requested input parameters. U.S. Pat. No. 5,774,386 where the inventors break a color transformation function into subfunctions and the intermediate results of each subfunction are used for memorization.

The applicants believe that the value reuse techniques in prior art differs from what is disclosed in this application in at least five reasons.

First, the applicants propose to extend the instruction set architecture (also known as ISA) of the computing system intended to employ the technology disclosed in the present application with new instructions (also known as specifications) dedicated for the operation and the management of the value cache.

Second, the applicants propose to extend the processing path (also known as data path) of the computing system intended to employ the technology disclosed in the present application with a new, special purpose functional unit dedicated to perform value reuses.

Third, the applicants disclose methods and techniques utilizing an electrical power minimization approach to identify appropriate points in the source code of the applications and insert on those points the value cache management instructions.

Fourth, a hardware mechanism is disclosed which may monitor the dynamic behavior of an executing computer program and specific means are provided to deactivate and reactivate the value cache operation during the execution of the specific computer program.

Fifth, the value cache storage area is augmented with extra functionalities, e.g., to dynamically change the order of the executing instructions of the executing computer program.

SUMMARY OF THE INVENTION

The various aspects of the present application provide methods and apparatus for operating a computing device to perform value reuse techniques. The technology of this application may be particularly beneficial in computer applications which calculate memory-intensive and processor-intensive operations, like the graphics processing applications intended to render 3-D graphics data.

The applicants propose new machine level instructions to be included in the instruction set architecture of the computing systems intended to utilize the technology provided in this application. The said instructions will be responsible for the general management of the value cache. The primary operations performed by the value cache are AddEntries and LookupEntries. AddEntries places results in the value cache and LookupEntries retrieves entries from the value cache (in case of a value cache hit), or produces misses if there is no corresponding entry or entries for the sought input parameters.

The value cache management instructions may contain extra fields either as part of the instruction opcode or as an extra instruction field argument. This extra information may include specific indications that may optimize the value reuse mechanism. For example, additional information may be added to indicate if the input parameters are interchangeable or independent from sign.

The invention provides a method for inserting the value cache management instructions in the source code of the software applications. The method solves this insertion problem as a power minimization problem.

Furthermore, a hardware mechanism is disclosed which may further improve the potential performance improvements and/or the electrical power savings achieved by the value reuse. The mechanism detects at run-time the payback provided by the value reuse and accordingly acts either to alter the memorization method or deactivate it temporary or permanently.

Moreover, the value cache storage area is extended to include extra information and additional functionalities that may dynamically change the order of the execution instructions of the executing software program and thereby to alter or even to increase the paybacks provided by value reuse.

This Summary is provided to introduce a selection of concepts in a simplified form that are further described below in the Detailed Description and also illustrated in the accompanying drawings. This Summary is not intended to identify key features or essential features of the claimed subject matter, nor is it intended to be used to limit the scope of the claimed subject matter.

DETAILED DESCRIPTION OF THE INVENTION

The various methods and circuits disclosed herein relate to the processing of graphics data and to techniques for eliminating the redundant complex calculations or memory operations during graphics data processing. Although the embodiments described herein are generally illustrated in the more specific context of the rendering of 3-D graphics data, those skilled in the art will appreciate the broader applicability of the disclosed techniques. Furthermore, although the disclosed redundancy elimination methods and apparatus are discussed with respect to a particular processing stage or type of graphics data, such as the pixel level (also known as fragment-level) shading operations discussed below, those skilled in the art will appreciate that many of these techniques may be applied in other stages and/or to other graphics data, such as the vertex-level operations.

Figure 1:
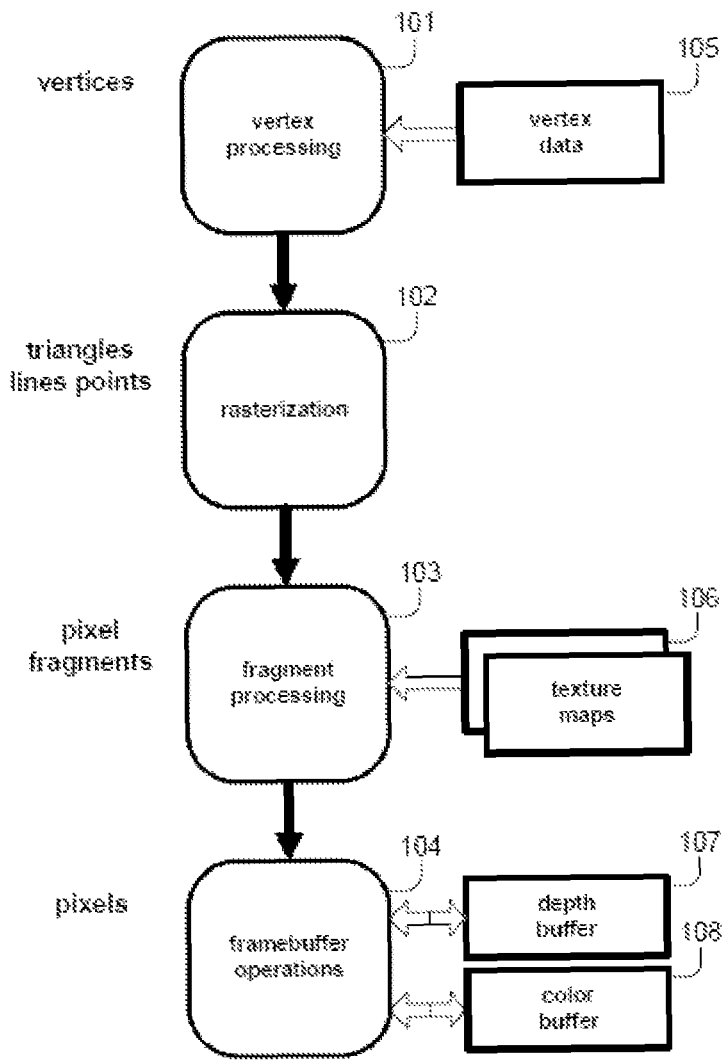
FIG. 1 is a flow diagram of a typical 3-D graphics processing pipeline.

FIG. 1 illustrates an abstract flow diagram of a conventional graphics processing unit (GPU) indented to render 3-D images. Those skilled in the art will recognize the general functions of the graphics processing stages as each of these stages corresponds to counterparts in conventional graphics processing stages. As shown in FIG. 1, an image is synthesized from a model consisting of geometric shape and appearance descriptions (including, inter alia, color and surface textures) for each object in the scene and environment descriptions such as lighting or atmospheric properties. The result of the synthesis is an image represented as a two-dimensional (2-D) rectangular array of pixel elements, where each pixel represents a discrete color sample of the image. To synthesize the final image, each object in the scene is rendered using a four-step sequence which includes: geometry processing 101, rasterization 102, pixel or fragment processing 103, and frame buffer processing 104. The details of those well-known graphics rendering operations are not necessary to a complete understanding of the present invention. However, a brief description of those operations is given below.

Geometry processing transforms a 3-D polygonal (usually a triangle) representation of the object surface to ultimately produce a 2-D projection of the object triangles. The transformations operate on the vertices 105 of the incoming triangle representation and apply mathematical operations which typically termed as vertex shading processing. Rasterization converts each resulting 2-D triangle to a collection of pixel fragments and each pixel fragment is subsequently processed to compute a final color value, a process known as pixel or fragment shading processing. The computation of this color value can range from simply using the interpolated color value to computing complex equations incorporating the geometric and appearance descriptions of the object and the environment description. These computations may include texture mapping operations that use the parametric coordinates of the fragment to sample an associated image or images (called texture maps 106) to generate a color value or other shading parameters. The resulting shaded pixel fragments are eventually written to a color buffer 108 that holds a single fragment for each pixel in the final image. As part of this operation, some other graphics related operations may occur (e.g., determining the pixel visibility using a special storage area usually called depth buffer 107).

As is known in the art, the two stages of the 3-D graphics pipeline which are typically programmable are the stages that occur the vertex and the fragment operations. However, different arrangements are also possible e.g., the rasterization stage may be also programmable or even the depth color related operations may be controlled by a programmable hardware engine. The said two stages may be programmed by a general purpose software language (such as C or Fortran) or even by an application specific graphics language such as HLSL, Cg, or GLSL.

As is known in the art, the vertex and the fragment stages are typically programmed with small custom shading programs (similar to subroutines), that are invoked for each vertex and for each pixel fragments. Those small, but computational and memory intensive programs, are usually referred to as shaders while other terms are also possible.

The technology provided herein does not pertain to a specific arrangement of the programmable stages of the graphics processing pipeline and it is more generally applicable even to non-graphics operations. In addition, the disclosed methods and apparatus are not restricted to a particular shading or general purpose programming language.

The invented techniques provided herein are particularly applicable to fragment shading operations, however those skilled in the art will appreciate the broader applicability of the disclosed technology. Fragment shaders typically consist of complex arithmetic calculation that may incorporate the geometric and appearance descriptions of the rendered objects and the environment descriptions. Such arithmetic operations may include machine level instructions that perform vectorized operations, multiple-add operations, square-root calculations, reciprocals etc. Furthermore, fragment shaders typically also include computations (and the associated memory fetches) for texture mapping operations.

Moreover, as it can be recognized by those skilled in the art, a subset of the fragment shading operations can be performed under small error budgets e.g., by lowing the precision of specific calculations. Since the final color values generated by the fragment shaders will be interpreted by the human senses which are not perfect, it is possible (in accordance to the present application) to introduce small and controllable errors during the fragment shading operations, if such approach will result in performance improvements or in electrical power reductions or both, even if such approach will not guarantee perfectly artifact-free output images.

Figure 2:
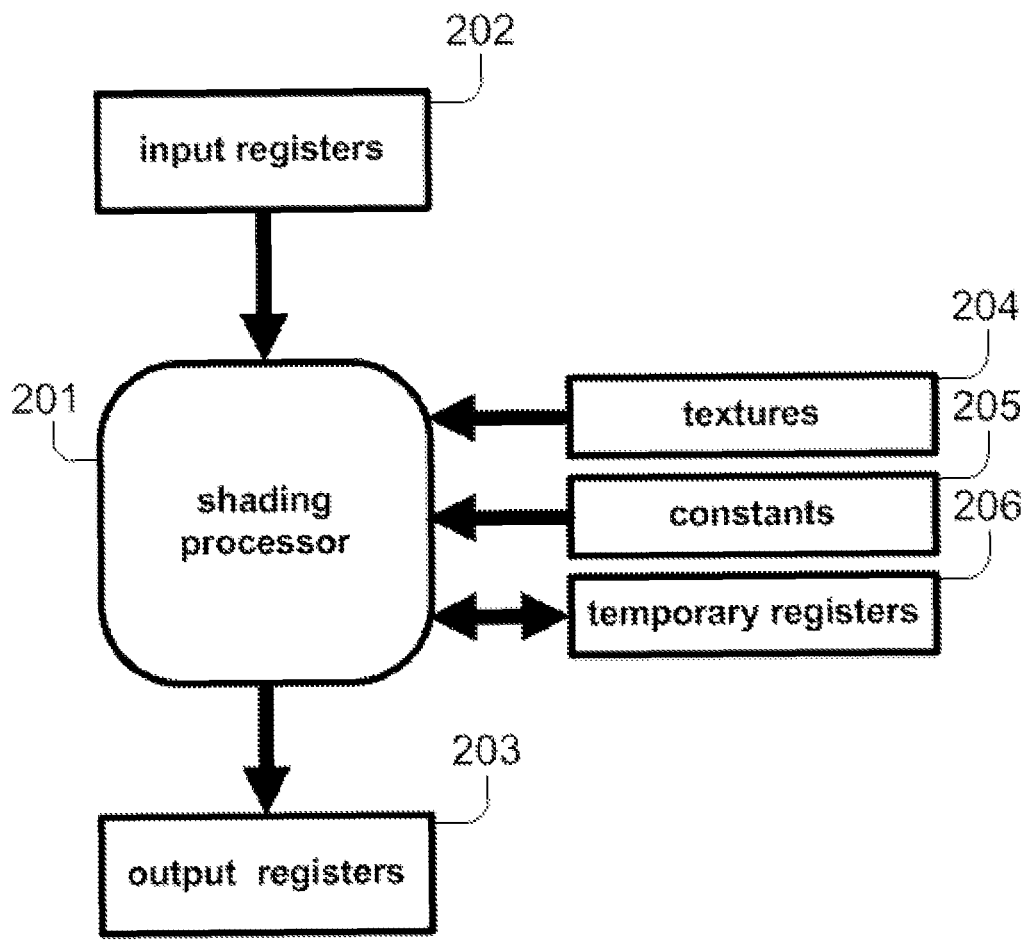
FIG. 2 illustrates an abstract diagram of a shading processor according to some embodiments of the present application.

FIG. 2 illustrates the block diagram of an arrangement of a shading processor 201 designed to execute a fragment shader software program. During execution, the shading processor operates on a fixed set of inputs and produces a single set of outputs intended to be used by the next stage of the graphics processing pipeline. The fragment shading program has access to a small set of constant parameters typically located in on-chip scratch registers 205, to another small set of registers intended to keep the intermediate results 206 and to a larger set of (typically off-chip) texture maps 204.

In the arrangement depicted in FIG. 2, the set of input parameters, the set of output parameters, and the set of constant parameters are physically organized as separate register files. However, different arrangements are also possible. For example, the two or all the sets of these parameters can be located in a single on-chip scratch storage area which may be multi-banked or not.

In the particular arrangement illustrated in FIG. 2, the input parameters located in the input register file 202 include, inter alia, the position of the target pixel, a set of color values, and a set of coordinates (usually the fog and the texture coordinates). The output parameters stored in the output register file 203 typically include the final color value of the pixel and extra information related to the visibility of the pixel (depth value).

In the technology described in this application, rather than executing each instruction in a fragment shader program one-by-one, as it would normally happen without applying the techniques disclosed herein, one or more instructions (preferably the most expensive instructions in terms of execution time or electrical power consumption) are bypassed (not executed). The part of the software code containing those one or more bypassed instructions will be termed as potentially skipped code segment (PSCS) hereafter. The method for bypassing the said PSCS relies on value reuse techniques according to which it is possible to eliminate redundant complex arithmetic calculations or redundant memory operations by memorizing (or caching) the results of previous computations of the PSCS. As already mentioned by the applicants, the dedicated storage area used for keeping the results of the previous computations will be referred as value cache.

Thereby, when evaluating a particular PSCS for or at a given set of new input parameters, the value cache is first checked to find out if the output results are saved in this area. If this is the case (a hit occurs in the value cache), the output results are immediately retrieved from the value cache and used by the software program. If the output results for the given set of input parameters are not in the value cache, the output results are calculated (as it would normally happen in a system without the technology provided herein) and, finally, the output results are stored in the value cache for future uses.

As it will be discussed further below, the applicants have recognized that the above-mentioned process can be used to reduce significantly the number of the redundant calculations or memory operations in fragment shader programs, thereby significantly reducing the number of executing instructions and hence this process can result in an improvement in the performance or a reduction in electrical power or both.

The applicants have recognized that it may be a relatively common occurrence for a new pixel to have the same or similar final color to a just rendered pixel, the final color of which has been already calculated, for example in regions of an image that do not change or do not significantly change from pixel to pixel (such as the sky in a digital image). Furthermore, the applicants have recognized that even if the final color of two consecutive rendered pixels is not the same, there is a great possibility that many of the shading operations performed for the two pixels will be the same (for example the calculations that depend on the position of the camera). Thus, by facilitating the ability to identify value reuse opportunities and avoid executing expensive redundant calculations or redundant memory accesses, a significant improvement in electrical power consumption or in performance or both can be achieved.

Thus, the technology described in this application can be used to significantly reduce the electrical power consumption and/or increase the performance, by facilitating the identification and elimination of redundant calculations and memory operations in the fragment shading programs. The present application extents to the provision of a hardware component which is able to monitor the redundancy elimination process (in other words, the value cache operation) at run-time and disable the value cache mechanism if it is deemed as non-beneficial in terms of electrical power savings or performance improvements. Furthermore, the technology described in this application offers new means to increase the number of eliminated instructions by, for example, identifying if the input parameters of the PSCS are interchangeable or by allowing small errors to occur in the redundancy elimination process as it will be further explained in the present application.

Figure 3:
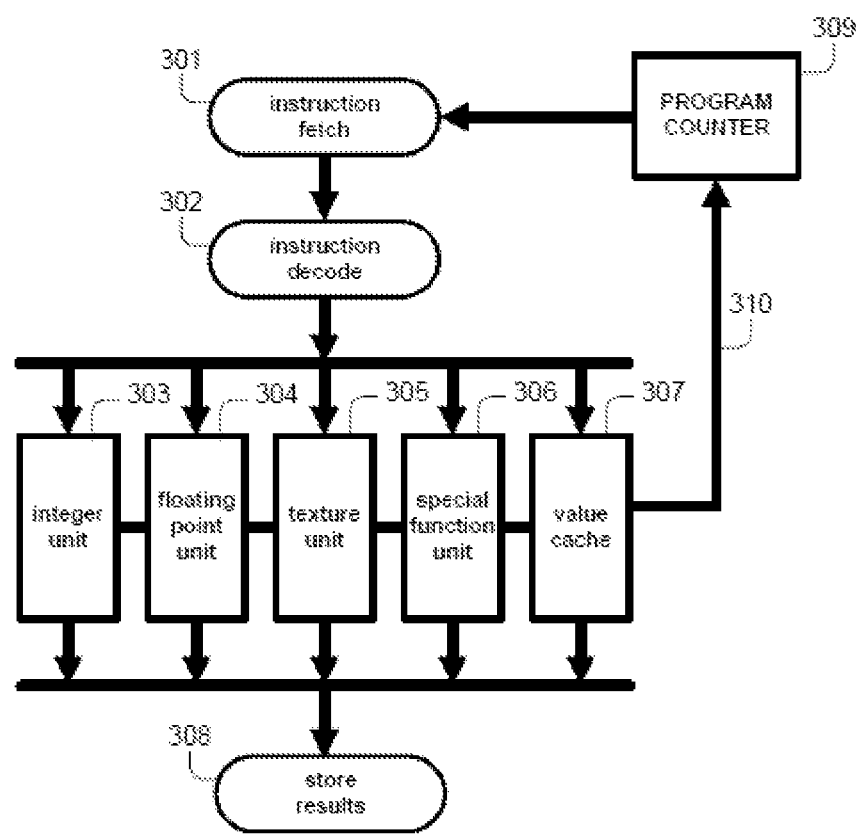
FIG. 3 illustrates a block diagram of an exemplary embodiment of the shading processor pipeline.

FIG. 3 illustrates a typical arrangement of a fragment shading processor which is in accordance to many of the embodiments provided in this application. The embodiment of the fragment processor, shown in FIG. 3, consists of a fairly simple in-order four stage pipeline, while different pipeline arrangements are also possible. After instructions are fetched 301, they are decoded and their operands are fetched 302. Depending on the type of operands, one of the three different register files are probed, based on the type of value that needs to be read (the constant, input, and temporary register files in FIG. 2).

Upon the source operands for a given instruction are fetched, the instruction is dispatched to the corresponding functional unit (FU). Operand buffering may be required in this step, if the execution of an instruction to a FU takes several cycles. Typically, four types of FUs are included in a fragment processor, although other arrangements are also possible. Those FUs are the ALU 303 (to perform scalar or vector arithmetic and logic operations on either integer or floating point data), the special functions unit 304 (to perform complex arithmetic calculations, like reciprocals or square root and sine calculations), the memory unit 305 (to perform load/store operations to the color buffer), and the texture unit 306 (to compute the color of a texture). In the last pipeline stage 308, the results of the FUs are stored in the temporal or in the output register file. The embodiment of FIG. 3 also contains a special purpose register, called program counter 309 (it would be referred as PC hereafter), which contains the address of the next to be fetched instruction. The applicants believe that a detailed explanation of the operation of the specific embodiment of the fragment processor, shown in FIG. 3, is not necessary to a complete understanding of the present application.

Furthermore, the embodiment depicted in FIG. 3 corresponds to a specific arrangement of a fragment processor. However, other arrangements are also possible. For example, a different number of pipeline stages may be employed or a form of simultaneous multi-threading processing may be also employed. The applicants desire to clarify that the technology disclosed in the present application do not rely on a specific arrangement of a fragment processor and it can be applied to all alternative configurations and arrangements of a fragment processor.

According to the first aspect of the technology described in the application, there is provided a method for explicitly architecting and operating a fragment processor to detect and eliminate the redundant or almost redundant arithmetic or memory operations. In contrast to prior art schemes discussed above, the technology provided herein proposes the provision of an extra FU to be inserted in the data path of a fragment processor. The role of this new FU will be to explicitly perform value reuse techniques in order to eliminate the redundant or almost redundant evaluation of complex expressions and memory operations.

The proposed new FU consists of a dedicated storage area intended to cache or hold the results of previous computations (namely the value cache) and the associated logic. This FU is named by the applicants after the term value cache functional unit (VCFU) 307 and the technology presented in this application discloses techniques for the operation of this unit. The applicants desire to clarify that the term value cache functional unit is intended to encompass all the alternative or equivalent devices or circuits that operate as defined by the methods and techniques disclosed in the present application.

A preferred embodiment of the VCFU is illustrated in FIG. 3.

The VCFU operates as a typical functional unit since it is configured and managed by specific machine-level instructions and it has access to the various register files of the fragment processor. Likewise, it is fed by input data located either in the input, constant, or temporary register file, it performs the corresponding operations and register reads as uniquely identified by the corresponding machine-level instructions, and it stores the results to the appropriate registers in the output or temporary register file, again as dictated by the corresponding machine-level instructions.

However, as it can be recognized by those skilled in art and as also shown in FIG. 3, the VCFU is equipped with a unique functionality typically absent in conventional FUs of a typical fragment processor (the rest of the FUs illustrated in FIG. 3). This unique characteristic is identified by the extra path 310.

Conceptually, the value cache functions as a lookup table which internally maps between a set of output results (e.g., the data itself) and a set of input parameters (e.g., an address or an identifier(s) of the stored output data). Once the data is stored in the value cache, it may be accessed and retrieved while the step-by-step calculation from the initial source input parameters is bypassed (namely the code segment is skipped). Thereby, if a value cache match (hit) occurs, the ordering of the to-be-executed instructions of the fragment shader program must be also modified.

The VCFU is responsible thereof to inform the PC that a dynamic branching in the fragment shader code must be immediately performed. In other words, the PC of the fragment processor is required to be notified about the size of the PSCS, namely the number of instructions consisting the PSCS, and accordingly perform the above dynamic branching. The detailed description of this dynamic branching process will be provided in the rest of this application through two exemplary value cache embodiments. Those skilled in the art will appreciate that this dynamic branching process can be viewed as regular dynamic branches triggered by conventional control-flow instructions (for example if-then like notations) which typically exist in almost all programming languages.

According to the second aspect of the technology discussed herein, this application extends to the provision of dedicated machine-level instructions for the explicit management of the VCFU. In particular, the applicants propose to extend the instruction set architecture (also known as ISA) of the fragment processor intended to employ the technology disclosed herein with extra instructions dedicated for the operation of the invented functional unit.

As it can be recognized by those skilled in the art, the primary operations performed by VCFU are the AddEntries and the LookupEntries operation. AddEntries places new results in the value cache and LookupEntries retrieves one or more entries from the value cache, in case of a value cache hit, or produces misses if there is no corresponding entry or entries for the sought input parameters.

Figure 4:
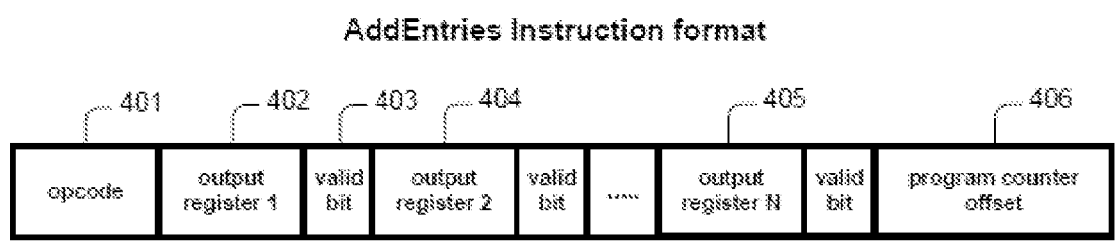
FIG. 4 illustrates an exemplary embodiment of the AddEntries instruction.

An exemplary structure of the AddEntries instruction is illustrated in FIG. 4.

The AddEntries instruction is responsible to place a new set of output results in the value cache storage area for future uses. The output results are defined as regular operands 402 404 405 inserted in the instruction structure and each operand corresponds to an identifier indicating a specific register in the register files of the fragment processor. The identifier may be a single number acting as a pointer to the corresponding register of the corresponding register file, while other potential arrangements are also possible.

Furthermore, each register operand in the AddEntries instruction is associated by a valid bit 403. The valid bit is responsible to indicate if the corresponding register operand should be decoded by the fragment shader decoder or if the corresponding register operand should be ignored by the processing pipeline e.g., by the processor decoder or by the VCFU or both.

In addition, the instruction structure of FIG. 4 includes an immediate value field 406. This field is equal to the number of instructions consisting the under evaluation PSCS of the target software program and it will be stored in the value cache memory array. As it will be understood upon the complete reading of this application, in case of a value cache match, the number embodied in this instruction field will be forwarded to the processor PC (this operation is shown by the 310 path) to perform the dynamic branching in the fragment shader code.

The discussed embodiment of the AddEntries instruction, also contains a dedicated field 401 to hold the machine code (also known as opcode) of the instruction. As is known in art, this field acts as a unique identifier of the present instruction.

As it can be recognized by those skilled in the art, the described embodiment of the AddEntries instruction is configured to support a variable number of output results or a variable number of output registers; however this arrangement is not necessary. For example, separate instructions (with different identifiers) may be employed to support one output operand, two output registers, three output registers and so on do forth. Of course, in the latter arrangement no valid bits will be required to be inserted in the instruction structure. Differently stated, the embodiment presented in FIG. 4 is a generalized structure of the AddEntries instruction and it is intended to encompass all alternative or equivalent arrangements, like the ones mentioned above.

Upon the AddEntries instruction is fetched, it passes through the decode stage of the fragment processor. At this point, all the valid register operands are extracted from the instruction operand bits. Consequently, the register operands are sent to the corresponding register files. When the register files receive the register operands, one or more register read transactions are initiated. Upon the results from the register files are made available, they are forwarded (along with some control bits) to the VCFU for further processing.

The associated logic of VCFU is responsible at this point to store the received values in an appropriate format for future uses. The received values are saved in the value cache storage area, the organization of which will be explained later in this application.

Figure 5:
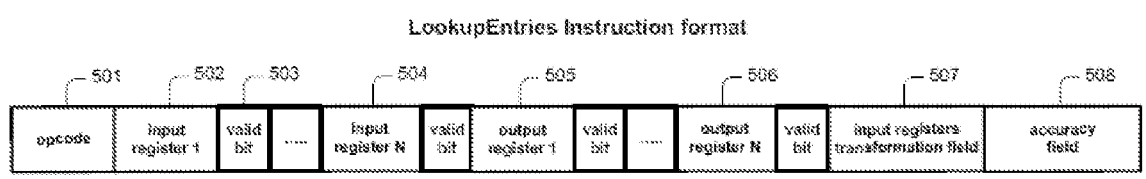
FIG. 5 illustrates an exemplary embodiment of the LookupEntries instruction.

Similar to the AddEntries instruction, an exemplary structure of the LookupEntries instruction is illustrated in FIG. 5.

The LookupEntries instruction is responsible to retrieve the output results of an under evaluation PSCS for or at a given set of new input parameters. Namely, during the execution of the LookupEntries instruction, the value cache is first checked to find out if the output results reside in the value cache area. The input parameters in this case act as a key to search the value cache storage area.

The input parameters and the output results are defined as regular operands 502 504 505 506 inserted in the instruction structure and each operand corresponds to an identifier indicating a specific register in the said register files of the fragment processor (one of the four register files shown in FIG. 2). The identifier may be a single number acting as a pointer to the corresponding register of the corresponding register file, while other arrangements are also possible.

Similar to the AddEntries instruction, each register operand in the LookupEntries instruction is associated by a valid bit 503. The valid bit is responsible to indicate if the corresponding register operand should be decoded by the fragment shader decoder or if the corresponding register operand should be ignored by the processing pipeline e.g., by the processor decoder or by the VCFU or both.

The described embodiment of the LookupEntries instruction is configured to support a variable number of input parameters (namely input register operands in FIG. 5) and a variable number of output results (namely output register operands in FIG. 5); however this arrangement is not necessary. For example, separate instructions (with different instruction identifiers) may be employed to support a plethora of input-output operands pair e.g., one input operand and one output operand, one input operand and two output operands, two input operands and three output operands, and so on do forth. Of course, in the latter arrangement no valid bits will be required to be inserted in the instruction structure. Differently stated, the embodiment presented in FIG. 5 is a generalized structure of the LookupEntries instruction and it is intended to encompass all alternative or equivalent arrangements, like the ones mentioned above.

Upon the LookupEntries instruction is fetched, it passes through the decode stage of the fragment processor. At this point, all the valid input register operands are extracted from the instruction operand bits. Consequently, the extracted input register operands are sent to the corresponding register files (either the constant, the input, or the temporary register file). When the corresponding register files receive the input register operands, one or more register read transactions are initiated. Upon the results from the register files are made available, they are forwarded to the VCFU for further processing.

The associated logic of the VCFU is responsible at this step to compare the received values (new input parameters) against the set of the input parameters stored in the value cache from previous computations. If there is no corresponding value cache entry for the sought input parameters (miss), then no more actions will be performed for the LookEntries instruction, namely the said instruction will exit the pipeline with no extra operations.

If a match occurs, then the value cache contains the output results which are associated with the given input parameters. The said output results are forwarded to the following pipeline stage 308 of the fragment processor. At this stage, the output register operands are extracted from the instruction operand bits. Consequently, the extracted output register operands are sent to the corresponding register files (either the output or the temporary register file in this case). When the corresponding register files receive the output register operands, one or more register write transactions are initiated, namely the retrieved output results are stored in the corresponding registers. Upon the said register write transaction are finalized, the output results are ready to be consumed by the fragment shading program and finally the LookupEntries instruction exits the processor pipeline.

Moreover, in the case of a value cache hit, the ordering of the to-be-executed instructions of the fragment shader program must be also modified. The detailed description of this operation will be provided in the remaining of this application through two examples.

The embodiment of the LookupEntries instruction, shown in FIG. 5, also contains a dedicated field 501 to hold the machine code of the instruction. As is known in art, this field acts as a unique identifier of the said instruction.

According to the third aspect of the technology discussed herein, this application also discloses methods to optimize the use of the value cache (that is to increase the number of the value cache matches), further improving the performance and/or the electrical power savings, or both, of the system that may utilize the technology presented in this application.

A particularly preferred method to increase the occurrences of the value cache hits may be to add an extra field in the instruction structure, like the field tagged as 507. This field can be set by considering redundancy related properties inherent in potentially skipped instructions. More specifically, many arithmetic calculations may include properties that may generate extra repetitive or redundant operations if the input parameters are appropriately transformed.

The purpose of transforming the input parameters (namely the input register operands) of a given PSCS is to bring them in a desired arrangement, so as to increase the occurrences of the value cache hits. Consequently, the extra field 507 may contain an indicator of how a new set of input parameters may be transformed. This indicator may be encoded in any desired format, for example using one-hot encoding or any other suitable encoding scheme.

The applicants have recognized that, inter alia, there are two possible input parameters transformations that may significantly enhance the resulting benefits of the underlying value reuse mechanism. These transformations are the interchangeability of the input parameters and the sign independence transformations which are explained below.

In accordance to the first disclosed transformation, the input parameters of certain operations may be interchanged without affecting the output results. A simple case for applying such transformation may be the multiply or addition instructions. However, the applicants have recognized the broader applicability of this transformation in PSCS consisting of two or more instructions.

In general, the interchangeable property may be extended to, in accordance to the technology proposed herein, include cases in which the input parameters are more than two. If, for example, there are four input parameters, the transformation field of the LookupEntries instruction can be appropriately decoded to denote, for example, which pairs or triples of input parameters (out of the four) are interchangeable. Again, the said encoding can be done in any suitable format. This application intends to include all the alternative or equivalent arrangements that explicitly denote in the LookupEntries instruction structure the possible interchangeable options of the input parameters in a given PSCS independently of the used underling encoding scheme.

In accordance to the second disclosed transformation, the sign of the input parameters of certain arithmetic computations may not affect the absolute value (not the signed value) of the output results. A simple case for applying such transformation can be the multiply or division instructions. However, the applicants have recognized the broader applicability of this transformation in PSCS consisting of two or more instructions.

In general, the sign independence property of the input parameters can be extended to, in accordance to the technology proposed herein, include cases in which the input parameters are more than two. If, for example, there are four input parameters, the transformation field of the LookupEntries instruction can be appropriately decoded to denote, for example, which input parameters (out of the four) do not affect the absolute value of the output results. Again, the said encoding can be done in any suitable format. This application intends to include all the alternative or equivalent arrangements that explicitly denote in the LookupEntries instruction structure that the sign of one or multiple input parameters do not affect the absolute value of the output results in a given PSCS independently of the used underling encoding scheme.

Another particularly preferred method to optimize the use of the value cache may be to add another extra field in the LookupEntries structure, like the field tagged as 508. This field may be set by considering that a subset of the fragment shading operations, or a subset of the executing operations in specific application domains in general, can be performed under small error budgets e.g., by lowering the precision of specific arithmetic calculations. This property may be applicable in specific application domains and particularly applicable when processing graphics data where the final generated color values are interpreted by the human senses which are not perfect. Differently stated, according to the present method of this application, it is possible to introduce small and controllable errors during the fragment shading operations, if such method will result in performance improvements or in electrical power reductions or both, even if such method will not guarantee perfectly artifact-free output images.

The applicant have recognized that the number of value cache hits may be significantly increased if the matching operation, between the new input parameters and the contents already stored in the value cache from previous calculations (termed as matching operands hereafter), will be performed by excluding some parts of the matching operands. In accordance to the proposed method, an embodiment of the discussed method may be to simply exclude some bits of the matching operands during the matching operation process. As it can be recognized by those skilled in the art, the preferred parts that may be excluded from the matching process are the parts comprising by the rightmost bits (also known as least significant bits) of the matching operands.

For example, if a new set of input parameters and the already stored input parameters in the value cache differ only in some rightmost bits, then the possibility to experience a value cache hit is significantly increased further increasing the performance improvements and/or the electrical power savings, or both, achieved by the value reuse mechanism.

The field denoted as 508 may be an indicator of the number of bits of the matching operands that may be ignored during the matching process. In accordance to the present embodiment the said number of bits may be unique and it may refer to all input operands. In another preferred embodiment, a different number of bits may be ignored in each input operand.

For example, assuming a specific case in which the input operands are two (although the discussed method is not limited to a specific number of input operands), then the information stored in field 508 may be appropriately encoded to indicate that one bit from both input parameters may be ignored or one bit from the first input parameter and two bits for the second input parameter may be ignored and so on do forth.

The said indicator stored in the LookupEntries instruction structure may be encoded in any desired format, for example using one-hot encoding or any other suitable encoding scheme. This application intends to include all the alternative or equivalent arrangements that explicitly denote in the LookupEntries instruction the number of the bits that can be excluded during the value cache matching operations independently of the used underling encoding scheme.

The purpose of the said method is to optimize the use of the value reuse technique, but it can be recognized by those skilled in the art that the said method may introduce errors in the final color values generated by the corresponding fragment shaders. The resulting errors might lead to undesirable visual artifacts in the rendered images under some circumstances. However, those skilled in the art will recognize that a subset of the fragment shading operations can be performed under small error budgets, in accordance to the discussed embodiment, since the final color values generated by the fragment shaders will be interpreted by human senses which are not perfect. Differently stated, it is possible to introduce small errors during the value cache matching operation, if such approach will result in performance improvements or in electrical power reductions or both, even if such approach will not guarantee perfectly artifact-free output images.

In essence, the field tagged as 508 must be carefully set so as, inter alia, to minimize the visual artifacts of the generated color data. The exact number of bits in each input parameter that may be excluded from the matching comparison process is a subject under optimization and must be identified after analyzing various other parameters of the graphics system such as, but not limited, to the depth of the color data produced by the tile rendering process, the electrical power consumed by the processing path of the graphics processor, and/or the effectiveness of the rendering algorithms used by the graphics processor (e.g., anti-aliasing algorithms).

Furthermore, since the disclosed embodiments may be used (although not exclusively) for reducing the electrical power consumption in mobile devices, such as PDAs, smart phones, or tablets, the exact number of bits in each input parameter that may be excluded from the matching comparison process may be defined after considering the requirements defined either by the user (e.g., quality of service requirements set by the user), and/or by the run-time conditions of the rendering hardware (e.g., the remaining battery life of a portable device or the lighting conditions of the environment in which the graphics device operates), and/or by a combination of the above parameters.

In a preferred embodiment, the said number of bits may be defined in design time and/or in compiler time via profiling. For example, during the design and/or implementation and/or compilation of a fragment shading program, an examination of all the possible number of bits for each input parameter may be performed and an appropriate arrangement may be decided based on specific optimization criteria which may be, inter alia, the quality of the rendered images, the reduction in electrical power consumption, the improvements in performance, the user requirements, or even a combination of all or some of the above parameters.

In another preferred embodiment, the above analysis may be performed by a just in time environment in which a just in time compiler may take into account the above exemplary criteria and accordingly modify the intermediate or executable code at run-time.

The applicants want to clarify that the two discussed methods (tagged as 507 and 508 in the LookupEntries instruction structure) are optional, that is, the LookupEntries instruction may or may not contain those two extra fields or may or may not contain one of those two extra fields. However, the applicants have recognized that the two said methods may optimize the use of the value cache technique and as a result to increase the benefits of the value reuse mechanism.

On the other hand and as it can be understood by the experienced readers of this application, the value cache mechanism must be extended by extra circuitry in order to support the above two optimization methods. This extra circuitry will add extra delay and extra consumed electrical power to the underlying value cache mechanism. Therefore, the utilization of the above two methods and the corresponding embodiments must be done after considering if the extra benefits provided by one or by both said methods compensates the overheads introduced by the extra circuitry required to support the corresponding hardware implementations of those two methods.

In essence, the applicants recognize that the inclusion of one or both of the above methods may be done after analyzing various parameters of the graphics system, such as, inter alia, the increase of the value cache matches, the electrical power consumed by the said extra circuitry, and the electrical power consumed by the processing path of the graphics processor.

In a preferred embodiment, the said analysis may be performed in design time via profiling. For example, during the design and/or the implementation of the value cache mechanism, an examination of the benefits provided by each one or by both said methods may be performed and an appropriate arrangement may be decided based on specific optimization criteria which may be, inter alia, the reduction in electrical power consumption, the improvement in performance, the user requirements, or even a combination of all or some of the above parameters.

In another preferred embodiment, the above analysis may be performed by a just in time environment in which a just in time compiler may take into account the above exemplary criteria and accordingly modify the intermediate or executable code at run-time. Note that in the last two preferred embodiments, the extra circuitry required by the said two methods may be included in the underlying value cache hardware mechanism, but this extra circuitry may be deactivated (that is not powered on) in order to eliminate the consumed electrical power and/or the extra delay introduced by the said circuitry.

The applicants also want to clarify that the arrangements of the two value cache management instructions illustrated in FIG. 4 and FIG. 5 correspond to exemplary structures of these instructions and the present application intends to encompass all the alternative or equivalent embodiments of the computer instructions that operate in an alternative or equivalent way to the functionality presented in the foregoing description.

Furthermore, the applicants also want to clarify that in accordance to the technology disclosed in the present application, the two said value cache management instructions will be part of the instruction set architecture of the processor or the computing platform intended to employ the technology disclosed in the present inventions. That is, these two machine-level instructions are meant to be visible to the compiler and assembler or the interpreter of the target computing platform.

In a preferred embodiment, those value cache decorations will be automatically inserted in the software code of the fragment shader programs by a compiler. In another preferred embodiment, those value cache decorations may be automatically inserted in the software code of the fragment shader programs by a just in time compiler that may be invoked by a just in time environment in which the said software program is executed. In a yet another preferred embodiment, the programmer or the writer of the software code may insert specific indicators to the software code so as to facilitate or force the compiler or the just in time compiler to insert those value cache decorations. A combination of the above three embodiments is also desirable.

A methodology for inserting the value cache decorations in the software code will be presented hereafter. The disclosed methodology will be presented in the form of exemplary cases showing particularly preferred embodiments of the use of the value cache and the VCFU. The applicants want to clarify that the said exemplary cases are provided for purposes of illustration and description and they are not intended to be exhaustive or limit the subject matter to the precise description of those exemplary cases.

Furthermore, the presented exemplary embodiments were chosen and they will be described in order to best explain the principles of the invented value reuse mechanism and its practical application to reduce the electrical power consumed by complex arithmetic calculations which typically exist in graphics data processing or in general to computational intensive programs. However, those skilled in the art will recognize the broader applicability of the disclosed technology either to improve the performance of the target device leading to more rapid systems and/or to reduce the memory transactions related to specific graphics operations.

According to the presented exemplary embodiments the value cache decorations are meant to be inserted by a compiler in the target object file of the target software program during the compiler code generation process. However, the technology of this application is more generally applicable. For example, a just in time environment may be also used to monitor and analyze the target executing program and accordingly modify its executable code. Furthermore, the insertion of the value cache decoration may be performed by analyzing also the intermediate code, the binary executable code, a decompiled code, or other form of executable code.

For illustration and description purposes the presented exemplary embodiments will be provided using a human readable source code which can be considered that is ready to be translated or compiled to intermediate code or machine executable code.

Example 1

Figure 6:
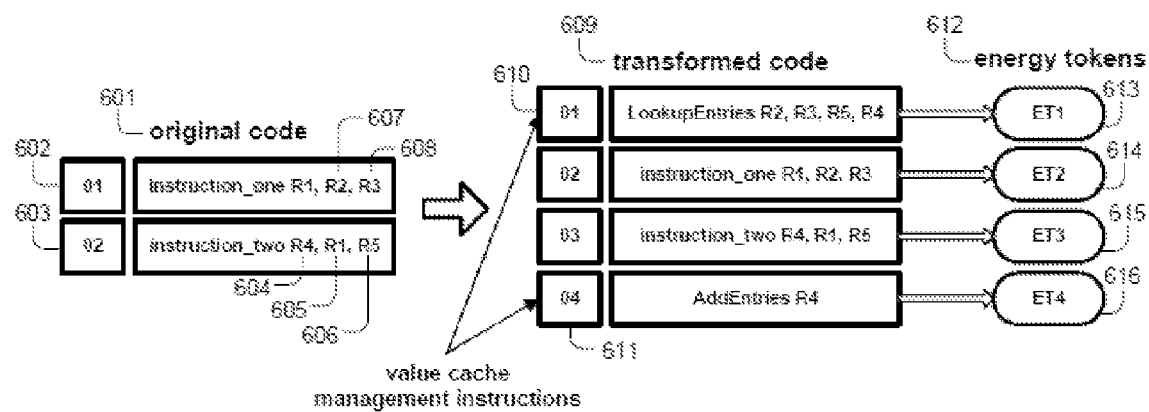
FIG. 6 illustrates an exemplary operation of the value cache management instructions and the associated method to insert the instructions in the source code of the software applications.

FIG. 6 illustrates an exemplary operation of the value cache management instructions and an exemplary method to insert those instructions in the software code of the target fragment shading programs. The purpose of the exemplary methods is to increase the payback, measured in terms of electrical power savings, from utilizing the value reuse technique and the associated VCFU.

FIG. 6 shows an embodiment of a potentially skipped code segment (PSCS) 601 consisting of two instructions tagged as 602 and 603. In each instruction, there are three register operands. The two rightmost register operands (for example the register operands 605 and 606 in instruction 603) denote the input or the source registers and the leftmost register operand (for example the register operand 604 in instruction 603) denote the output or destination register.

As it can be understood by those skilled in the art, the said PSCS consists of three input parameters noted as 606, 607, and 608, one output parameter noted as 604, and one register, noted as 605, intended to hold the intermediate output result produced by the first instruction 602. In the context of the specific example, the register 605 may be considered as a temporary register that may be located in the temporary register file of a shading processor. The illustration tagged as 609 depicts a potential transformation of the said PSCS which is in accordance to the technology provided in this application. The value cache management decorations in 609 are inserted at the beginning (before instruction 602) and at the end (after instruction 603) of the said PSCS. Those value cache decorations are intended to perform the value reuse operation (that is, to exploit value redundancy) and bypass the instructions of the said PSCS, if such bypass operation will lead to electrical power savings.

In accordance to the illustrated transformed code, prior to the execution of the particular PSCS of FIG. 6, the value cache storage area is first checked via the LookupEntries instruction 610. The operands of the LookupEntries instruction are the input registers and output registers of the evaluated PSCS. More specifically, the input registers are denoted by the three leftmost instruction operands (i.e., R2, R3, and R5) and the output register is denoted by the rightmost instruction operand (i.e., R4). When the invented VCFU receives the given set of input parameters (during the LookupEntries instruction execution), the value cache storage area (part of VCFU) is checked to find out if the output result are located in this area. If this is the case (a hit occurs in the value cache, that is the output results are located in the value cache from previous calculations), the output results are immediately retrieved from the value cache. At this point, the VCFU is responsible to forward the retrieved results to the corresponding output register (register R4 in the context of the discussed example). If the output results for the given set of input parameters does not exist in the value cache, the output results are calculated (as it will normally happen in a system without the technology provided herein) and, finally, the output results are stored in the value cache for future uses via the AddEntries instruction 611. As it can be understood, the AddEntries instruction as well as the instructions comprising the said PSCS are executed only during a value cache miss.

As it can be recognized by those skilled in the art, in the case of a value cache hit, the ordering of the to-be-executed instructions of the target software code must be accordingly modified. In this case, the VCFU is responsible thereof to inform the processor fetch stage (which is typically controlled by the processor PC) that a dynamic branching in the fragment shader code must be immediately performed. In a preferred embodiment, the value cache storage area contains an extra field which includes this information i.e., the step that must be performed in the target software code. In the context of the discussed example, this step is equal to the number of instructions consisting the said PSCS. Thereby, in case of a hit, the VCFU must output not only the output results, but also the number of the PSCS instructions. The resulting number of PSCS instructions is forwarded by the VCFU to processor PC, so as the said dynamic branching in the software code will be performed. The number of PSCS instructions is stored in the value cache when the AddEntries instruction is executed for the first time. Those skilled in the art will appreciate that the VCFU may operate similarly to a conventional branch prediction unit which typically exists in some processors, but usually it is absent in processors or processing units intended to process graphics data.

Figure 7:
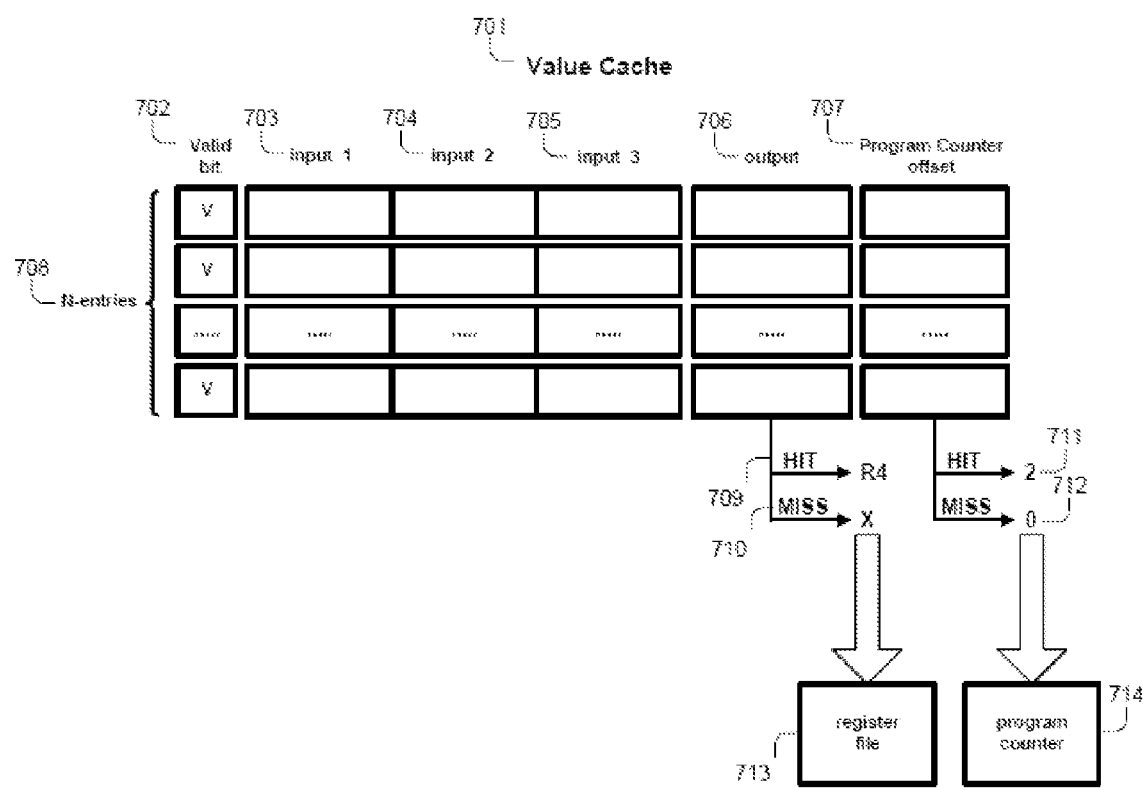
FIG. 7 illustrates a block diagram of an exemplary embodiment of the value cache functional unit.

FIG. 7 depicts a block diagram of an embodiment of the value cache storage area (part of VCFU) which is in accordance to the exemplary PSCS illustrated in FIG. 6. The presented value cache arrangement 701 consists of several entries 708 and each entry is decomposed into several fields. A valid bit 702 is attached to each value cache entry to indicate which entries contain valid data. The arrangement of FIG. 7 is appropriately configured to support the execution of the value cache management decorations depicted in FIG. 6.

The locations in the illustrated value cache tagged as 703, 704, 705 are intended to hold arithmetic values that will participate in the value cache matching process. During the execution of the LookupEntries instruction 610, the arithmetic values stored in R2, R3, and R5 registers will be forwarded to the value cache (those three values will act as a key to search the value cache storage area). The arithmetic value initially stored in R2 register will be compared against the arithmetic value stored in 703 field. Similarly, the arithmetic value initially stored in R3 register will be compared against the arithmetic value stored in 704 field and the arithmetic value initially stored in R5 register will be compared against the arithmetic value stored in 705 field.

The circuit logic of the value cache (not shown in FIG. 7) must operate to instrument the said comparisons. If the three comparisons indicate a match (the arithmetic value stored in the corresponding input registers and the arithmetic value stored in the corresponding value cache input locations are equal), a value cache hit signal is issued; otherwise a value cache miss signal is issued.

In a preferred embodiment, the value cache circuit logic may not contain additional logic to encode and direct the said comparison process to take into account the transformation and the accuracy fields that may exist in the LookupEntries instruction. In an another particularly preferred embodiment, the value cache circuit logic may contain additional logic to encode and direct the said comparison process to take into account the transformation 507 and the accuracy fields 508 that may exist in the LookupEntries instruction.

After the comparison process is finalized, appropriate actions must take place based on the comparison result. In case of a value cache hit, the arithmetic value stored in the value cache output field 706 of the matching value cache entry is read and forwarded to the corresponding register 709 (R4 in the context of the discussed example) of the corresponding register file 713 which may be either the temporary or the output register file of a shading processor. In parallel, the arithmetic value stored in the value cache program counter offset field 707 of the matching value cache entry must be also read 711 and forwarded in the processor program counter 714, so as the processor control flow logic can bypass the execution of the discussed PSCS.

If case of a value cache miss, the output result must be calculated (as it will normally happen in a system without the technology provided herein), hence no write transactions 710 will be performed in the temporary or output register file and the VCFU must also notify the processor control flow logic 712 that no instruction bypassing actions will be performed.

As it can be recognized by those skilled in the art, the benefits of the proposed value cache mechanism may be threefold. First and most importantly, in case of a value cache hit, the instructions consisting the PSCS will be bypassed (not executed) which may lead to performance improvements and/or electrical power savings. Second, some temporary registers (register R1 in the context of the discussed PSCS) may not be accessed which may also lead to performance improvements and/or electrical power savings. Third, some data dependencies between subsequent instructions (for example, the read-after-write data dependence between the two instructions of the discussed PSCS) may not have to be evaluated which may also lead to performance improvements and/or electrical power savings.

A critical design parameter of the value cache storage area is the number of value cache entries. In general, by increasing the number of value cache entries, the possibility to experience a value cache hit is also increased, but the electrical power consumption and the latency of the value cache is also increased.

The applicants have recognized that a relatively limited number of entries is required in the value cache. However, as it can be understood by those skilled in art, the exact number of entries is a subject under optimization (e.g., via profiling) and should be identified after considering various parameters such as, but not limited, to the occurrences of the value cache hits and how the number of value cache hits is changed when the value cache entries are increased, the electrical power consumed by the value cache, and the electrical power consumed during the execution of the said PSCS.

The applicants want to clarify that the specific arrangement of the value cache illustrated in FIG. 7 is not only applicable for the PSCS shown in FIG. 6, but it can be used, as it is, for all the PSCS that have three input parameters and one output register.

According to the fourth aspect of the technology disclosed in this application, the target software program may be analyzed to determine all the PSCS that have the same number of input and output parameters with the discussed PSCS. In a preferred embodiment, this analysis may be performed by traversing the control flow graph of the target software program in order to identify groups of instructions (i.e., PSCS) with three input parameters and one output register. Those skilled in the art will recognize that it is desirable the sought groups of instructions to include the maximum possible number of machine level instructions, so as the benefits of the value reuse mechanism will be maximized. Thus, in the case of the value cache organization illustrated in FIG. 7, the desired groups of instructions must adhere to two conditions. First, the number of the input and output parameter must be as discussed and the sought groups of instructions must include the maximum possible number of machine level instructions. The applicants have recognized that the said process to identify PSCS is straightforward and relatively simple (e.g., it is not time or memory consuming process) which may be considered as an additional benefit of the technology provided in the present application.

In another preferred embodiment, the said analysis may be performed by traversing an intermediate representation or any kind of flow representation of the target software application. In a yet another preferred embodiment, this analysis may be performed statically. Static analysis may be done during the compilation of the target software application or by any kind of tool or tools that may analyze a representation of the software code prior to execution. In a yet another preferred embodiment, the said analysis may be performed dynamically in a just in time or instrumented environment in which a just in time compiler may take into account the said two conditions and accordingly modify the intermediate or executable code at run-time.

As it can be recognized by those skilled in the art, the invented VCFU may add time and electrical power consumption overheads. The overheads may include testing and retrieving the results from the value cache prior to executing the target PSCS (during the execution of the LookupEntries instruction) plus the overheads of storing the results (during the execution of the AddEntries instruction). Namely, the potential benefits of the proposed VCFU not only depend on the number of PSCS instances it has eliminated, but, inter alia, on the time and electrical power spent in detecting the instances to be eliminated and updating the value cache storage area.

According to the fifth aspect of the technology discussed herein, a methodology to optimize the use of the value cache functional unit is disclosed. The target of the proposed methodology is to maximize the electrical power savings provided by the said unit. However, those skilled in art will recognize that the proposed methodology is more generally applicable and may be used, for example, to maximize the performance improvements of the said unit.

In the context of the specific example illustrated in FIG. 6, each machine level instruction is assigned with a particular energy token 612, that is the amount of energy spent by the target processing unit during the execution of each machine level instruction. The said energy tokens may be measured by a real measurement system, for example a wattmeter, or may be estimated by a suitable power simulator (that is, any kind of software program that can estimate the energy consumed by the target shading processor). Furthermore, the energy tokens may be expressed using any suitable energy unit, for example nanojoules, or as a relative number, for example as a number normalized to the energy consumed by another machine level operations. The applicants want to clarify that the disclosed technique is independent on the way by which the per-instruction energy tokens have been calculated and/or expressed and the present application intends to include all the equivalent or alternative ways for measuring and expressing the energy consumed by a machine level instruction of the target fragment shading program.

As illustrated in FIG. 6, every instruction consisting the discussed PSCS (602 and 603) and the value cache management instructions (610 and 611) are associated by a measured or calculated energy token. In case of a value cache hit, only the energy token (ET1) 613 will be consumed by the target shading processor (the subsequent three instructions will be bypassed). In case of a value cache miss, the total energy consumed by the target shading processor will be defined by the addition of all the energy tokens depicted in FIG. 6, that is: ET1 613 plus ET2 614 plus ET3 615 ET4 616.

Afterwards, a threshold (termed as TH hereafter) may be determined to indicate under which conditions the said value cache mechanism can reduce the electrical power consumption for the discussed PSCS 601. In a preferred embodiment (used hereafter) the said threshold may be defined as the number of the value cache hits divided to the number of value cache accesses (also known as cache hit ratio), however other arrangements are also possible. For example, the said threshold may be defined as the number of the value cache misses divided by the number of value cache accesses. As it obvious, the number of value cache accesses is equal to the number of times the discussed PSCS would be executed without utilizing the technology disclosed in this application.

As it can be recognized by those skilled in the art, the number of value cache hits is a function of the target fragment shading software program and/or the form of the under processing 3-D graphics data. Higher value cache hit ratios may lead to higher electrical power savings whereas lower value cache hit ratios may indicate that the discussed value reuse mechanism is not beneficial for the said PSCS.

According to the discussed methodology, the next step may be to determine a TH above which the disclosed value reuse mechanism is beneficial for the discussed PSCS. An embodiment of this process which is in accordance to the exemplary case illustrated in FIG. 6 may be as follows:

Energy without value reuse (EWOUT): $ET2+ET3$

Energy with value reuse (EW): $TH*ET1+(1-TH)*(ET1+ET2+ET3+ET4)$

Obviously, what is desirable is the following:

$$EW<EWOUT$$

which may be transformed as:

$$TH>(ET1+ET4)/(ET2+ET3+ET4) \quad (1)$$

For example, if, for illustration purposes, we assume that:
ET1=4 power units
ET2=3 power units
ET3=3 power units
ET4=2 power units
then $$TH>0.75 \quad (2)$$

The above example indicates that for a value cache hit ratio greater than 0.75 (as defined by the inequality (2)), the disclosed value reuse mechanism is able to provide electrical power savings, when the discussed PSCS is executed, compared to the case in which the technology provided in this application is not used. Obviously, the higher the value cache miss ratio (as long as it is higher than 0.75), the higher the electrical power savings.

The applicants want to state that the inequality (1) may not be valid for a given set of energy tokens. Differently stated, the inequality (1) may lead to TH above 1 which is obviously non applicable, since the TH must be, by definition, below or equal to 1. This may happen when the PSCS consists of relatively simple instructions i.e., by instructions which consume a small amount of energy when executed. This behavior also indicates that the disclosed value cache reuse mechanism is particularly applicable to PSCS comprising of relatively complex and energy consuming instructions, such as vector calculations, multiple-add operations, square-root calculations, reciprocals etc.

The applicants want also to state that the process of calculating the TH is a relatively simple process, requiring only few additions and one division, which may be considered as an additional benefit of the technology provided in this application.

According to the sixth aspect of the technology disclosed herein, this application provides a number of embodiments to assess the paybacks (measured in terms of electrical power savings) reported by each identified PSCS, when employing the proposed value reuse mechanism.

According to a preferred embodiment, each identified PSCS may be analyzed statically via profiling. For example, the target fragment shading software program may be executed in an instrumented environment under many different loads while collecting the value cache hit ratios of each identified PSCS. The collected hit ratios may be compared against the calculated THs of each identified PSCS. The results of the said comparisons may be analyzed to select the PSCS that may benefit from employing the invented value reuse mechanism.

The selection process may favor PSCS that provide the highest paybacks in terms of electrical power savings. The target fragment software program may be recompiled or decompiled and recompiled again to limit the value cache decoration instructions only to the selected PSCS. The loads may include representative loads, benchmarking loads, loads from prior executions, or even randomly selected or randomly generated loads. The analysis of the identified PSCS may be performed en masse or by examining one or more identified PSCS in each profiling run.

In another particularly preferred embodiment, each identified PSCS may be analyzed dynamically during normal execution of the target fragment shading software program. For example, a just in time instrumented environment may be employed to trace the behavior of each PSCS and determine if a particular PSCS may benefit from the proposed value reuse mechanism. If a particular PSCS or many PSCS are proved to be beneficial for employing the proposed value reuse mechanism, then a just in time compiler may be invoked to insert the value cache management instructions in the appropriate points of the executable or intermediate code of the running fragment shading software program.

The selection process may again favor PSCS that provide the highest paybacks in terms of electrical power savings. The analysis of the identified PSCS may be performed en masse or by testing one or more identified PSCS at a time. In the particular embodiment, the performance of the running software program may be very poor during the instrumented execution. The instrumented execution may be performed in time intervals followed by time intervals of non-instrumented execution and so on do forth. Alternatively, the instrumented execution may be performed only for a small time period in the beginning of the code execution (this small time period may be termed as a training phase).

Figure 8:
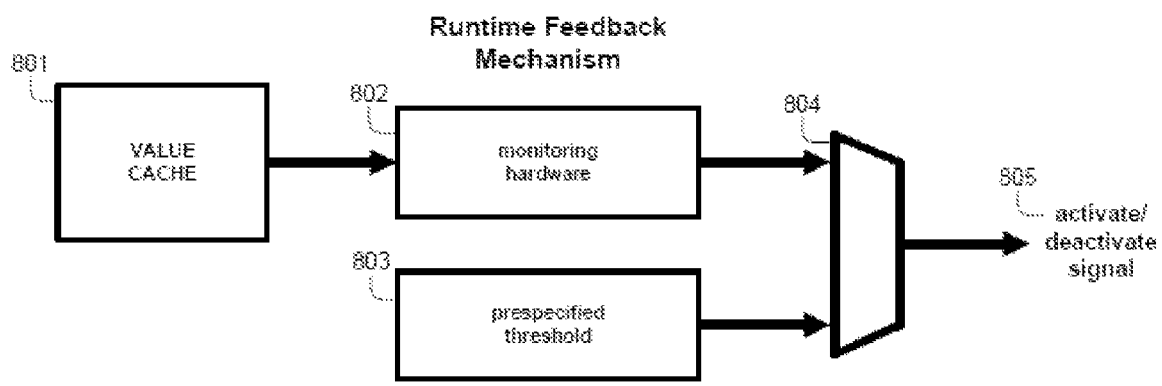
FIG. 8 illustrates a hardware configuration of the run-time value cache feedback mechanism.

In another particularly preferred embodiment which is in accordance to the illustration depicted in FIG. 8, the behavior of each identified PSCS may be tracked dynamically during the normal execution of the target fragment shading software program by a hardware circuit. An abstract block diagram of the said circuit is illustrated in FIG. 8. A dedicated hardware module 802 may observe the run-time value cache 801 hit ratio when the value cache storage area is used by one or more identified PSCS. The collected hit ratio or hit ratios may be compared by a comparison circuit 804 against the calculated TH of the observed PSCS. The calculated TH may be stored in a special purpose register 803. This special purpose register may be a programmer visible register or a configuration register. In a specific embodiment, the results of comparison process 805 may be used to deactivate or power-down the value cache reuse mechanism for one or more PSCS that are not proved beneficial for employing the proposed mechanism. In another embodiment, the results of the comparison may set a signal to trigger and invoke a just-in-time compiler to remove the value cache decorations from the running software code.

Again, the analysis of the identified PSCS may be performed en masse or by observing one or more identified PSCS at a time. The observed PSCS may be a set of PSCS that provide the highest paybacks in terms of electrical power savings. The operation of the monitoring hardware may be performed in time intervals followed by time intervals of non-monitored execution and so on do forth. Alternatively, the monitored execution may be performed only for a small time period in the beginning of the code execution (this small time period may be termed as a training phase).

Those skilled in the art will recognize that the discussed PSCS shown in FIG. 6 and the corresponding arrangement of the value cache shown in FIG. 7 have been chosen only for illustration and description purposes. Other value cache arrangements are also possible to be employed and the present application intends to encompass all the alternative arrangements, such as a value cache with a smaller or larger number of input parameters, and/or a value cache with larger number of output result fields, and/or PSCS consisting of smaller or larger number of machine-level instructions.

For example, a value cache arrangement may be used which may have four input parameters and four output fields. The applicants want to clarify that even with such value cache arrangement, the instruction code shown in FIG. 6 may be considered as a PSCS, although the particular PSCS contains fewer input and output parameters. In such a case, the unused value cache fields may be powered down (the corresponding energy tokens of the cache management instructions may be accordingly modified), so as a reduction in the electrical power consumed by the value cache may be achieved.

Example 2

Figure 9:
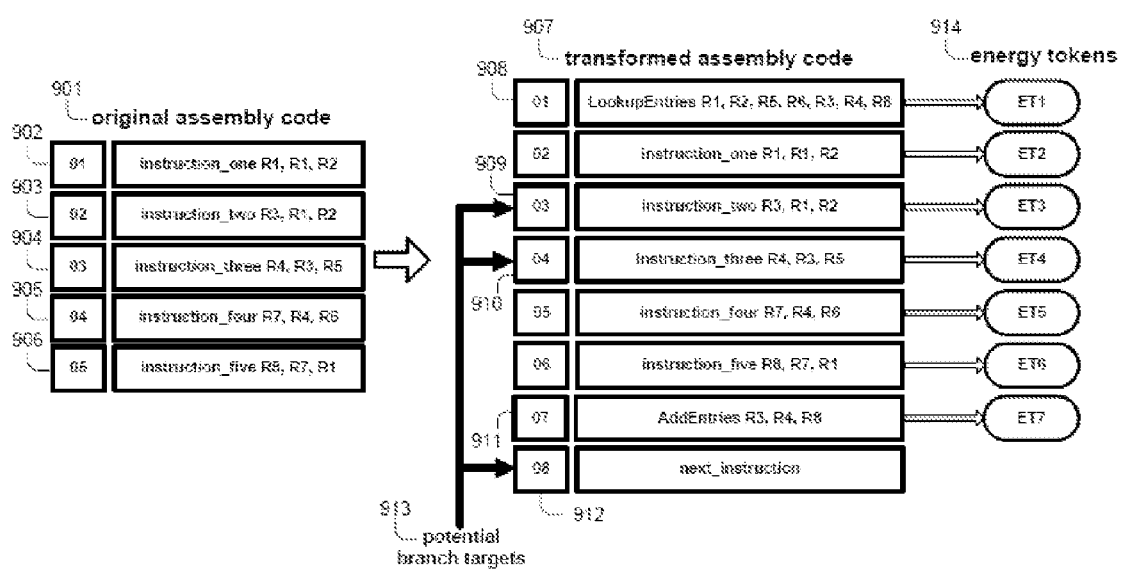
FIG. 9 illustrates a second exemplary operation of the value cache management instructions and the associated method to insert the instructions in the source code of the software applications.

FIG. 9 illustrates another exemplary operation of the value cache management instructions. The purpose of the second example is to introduce an alternative usage of the VCFU which is in accordance to the seventh aspect of the technology disclosed in the present application. Similar to the previous example, an exemplary method to insert the value cache management instructions will be discussed. Again, the purpose of the discussed aspect is to increase the payback, measured in terms of electrical power savings, from utilizing the value reuse technique and the associated VCFU.

FIG. 9 shows an embodiment of a PSCS 901 consisting of five instructions tagged as 902, 903, 904, 905, and 906. The instruction format is similar to the previous example. Those skilled in the art will recognize that the said PSCS consists of four input parameters indicated by R1, R2, R5, and R6 registers and one output parameter indicated by R8 register. All the other registers illustrated in the discussed PSCS are intended to hold the intermediate result and may be considered as temporary registers that may be located in the temporary register file of a shading processor (the said registers will be termed as intermediate registers hereafter).

The illustration tagged as 907 depicts a potential transformation of the said PSCS. Similarly to the previous example, the value cache management decorations in 907 are inserted at the beginning (before instruction 902) and at the end (after instruction 906) of the said PSCS. Those value cache decorations are intended to perform the value reuse operation (that is to exploit value redundancy) and bypass the instructions of the said PSCS, if such bypass operation will lead to electrical power savings.

However, unlike the previous example and in accordance to the seventh aspect of the technology discussed herein, the value cache management instructions may include not only the input and the output parameters, but also some intermediate registers (R3 and R4 registers in the context of the specific example).

In accordance to the illustrated transformed code, prior to the execution of the particular PSCS of FIG. 9, the value cache storage area is first checked via the LookupEntries instruction 908. The operands of the LookupEntries instruction are the input registers and output registers as well as two intermediate registers of the evaluated PSCS. More specifically, the input registers are denoted by the four leftmost instruction operands (i.e., R1, R2, R5, and R6), the output register is denoted by the rightmost instruction operand (i.e., R8), whereas the intermediate registers are denoted by R3 and R4 registers.

When the VCFU receives the given set of input parameters, the value cache storage area is checked to find out if the output results are located in this area, as it is already explained in the previous example. However, a main difference herein is that one out of three types of value cache hits may occur. The type of a value cache hit may be defined after the comparison process between the input parameters and the arithmetic values stored in the value cache will be performed. The type of value cache hit will also define the output register in which the data retrieved by the value cache should be forwarded.

Obviously, in case of a value cache miss, the output results must be recalculated (as it will normally happen in a system without the technology provided in this application) and, finally, the output results may be stored in the value cache for future uses via the AddEntries instruction 911. A distinction point herein (compared to the previous example) is that the AddEntries instruction may also store in the value cache the arithmetic values of the said intermediate registers.

As it will be recognized by those skilled in the art, the type of the value cache hit may also define the ordering of the to-be-executed instructions of the target software code. Another distinction point herein is that different branches in the target fragment shading code may occur based on the type of the value cache hits.

Figure 10:
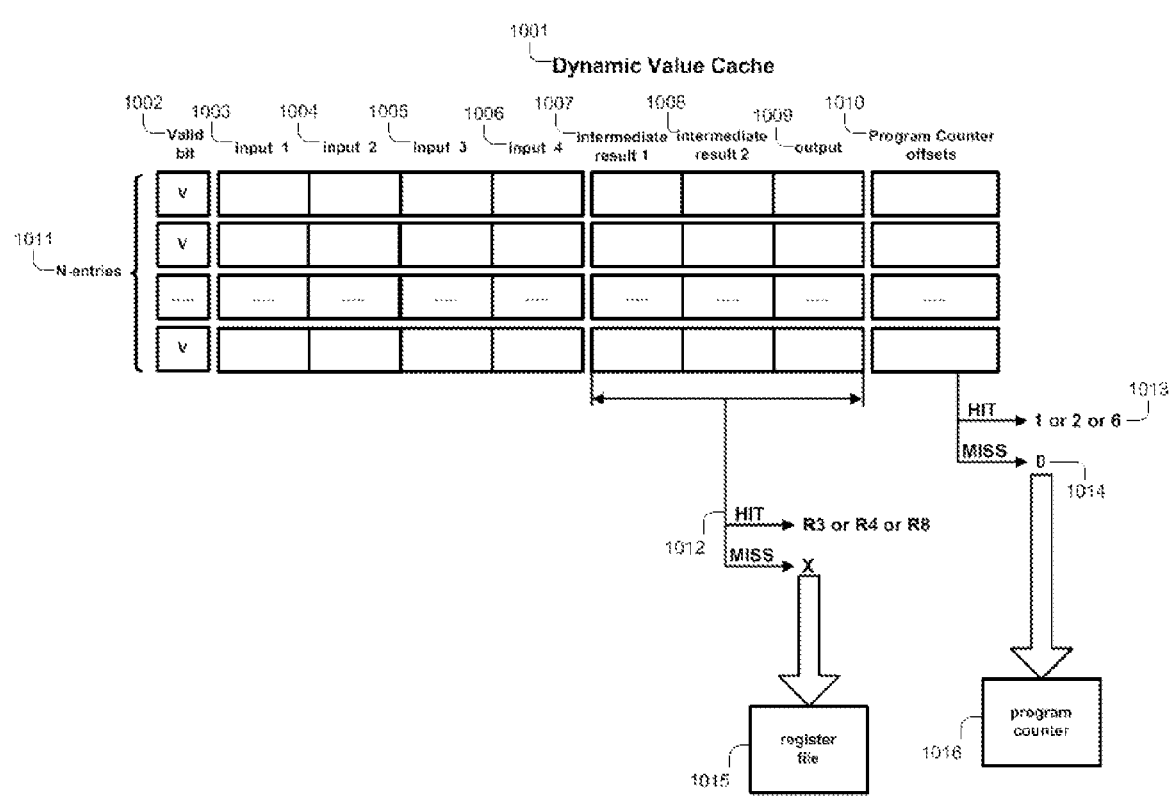
FIG. 10 illustrates a block diagram of a general embodiment of the value cache.

FIG. 10 depicts a block diagram of an embodiment of the value cache storage area (termed as dynamic value cache hereafter) which is in accordance to the exemplary PSCS illustrated in FIG. 9. The presented value cache arrangement 1001 consists of several entries 1011 and each entry is decomposed into several fields. Again, a valid bit 1002 is attached to each entry of the dynamic value cache to indicate which entries contain valid data. The arrangement of FIG. 10 is appropriately configured to support the execution of the value cache management decorations depicted in FIG. 9.

The locations, in the illustrated dynamic value cache, tagged as 1003, 1004, 1005, and 1006 are intended to hold arithmetic values that will participate in the value cache matching process. During the execution of the LookupEntries instruction 908, the arithmetic values stored in the R1, R2, R5, and R6 registers will be forwarded to the value cache (those four values will act as a key to search the value cache storage area). The arithmetic value initially stored in R1 register will be compared against the arithmetic value stored in 1003 field. Similarly, the arithmetic value initially stored in R2 register will be compared against the arithmetic value stored in 1004 field, the arithmetic value initially stored in R5 register will be compared against the arithmetic value stored in 1005 field, and the arithmetic value initially stored in R6 register will be compared against the arithmetic value stored in 1006 field.

The circuit logic of the dynamic value cache (not shown in FIG. 10) must operate to instrument the said comparisons. The results of the said four comparisons (i.e., the number of the matches) may define the type of the value cache hit or indicate that a value cache miss occurred. In a preferred embodiment, the value cache circuit logic may not contain additional logic to encode and direct the said comparison process to take into account the transformation and the accuracy fields that may exist in the LookupEntries instruction. In an another particularly preferred embodiment, the value cache circuit logic may contain additional logic to encode and direct the said comparison process to take into account the transformation and the accuracy fields that may exist in the LookupEntries instruction.

In the context of the discussed PSCS shown in FIG. 9, some desired types of value cache hits may be as follows:

Type 1: matches occurred in all input parameters (R1, R2, R5, R6).

Type 2: matches occurred in three leftmost input parameters (R1, R2, R5).

Type 3: matches occurred in two leftmost input parameters (R1, R2).

After the comparison process is finalized, appropriate actions may take place according to the comparison results. In case of a value cache hit, the type of the value cache hit may be identified. In a type 1 hit, the arithmetic value stored in the value cache output field 1009 of the matching value cache entry is read and forwarded in the corresponding register 1012 (R8 in the context of the discussed example) of the corresponding register file 1015. In a type 2 hit, the arithmetic value stored in the value cache intermediate result field 1008 of the matching value cache entry is read and forwarded in the corresponding register (R4 in the context of the discussed example) of the corresponding register file. In a type 3 hit, the arithmetic value stored in the value cache intermediate result field 1007 of the matching value cache entry is read and forwarded in the corresponding register (R3 in the context of the discussed example) of the corresponding register file.

In parallel to the above process and based on the type of the observed value cache hit, the value cache program counter offsets field 1010 of the matching value cache entry may be also read 1013 and the processor PC 1016 may be accordingly updated, so as the processor control flow logic can bypass the execution of the discussed PSCS or some instructions of the discussed PSCS. In case of a type 1 hit, the arithmetic value "6" may be forwarded to the processor PC (next to-be-executed instruction will be instruction 912). In case of a type 2 hit, the arithmetic value "2" may be forwarded to the processor PC (next to-be-executed instruction will be instruction 910). In case of a type 3 hit, the arithmetic value "1" may be forwarded to the processor PC (next to-be-executed instruction will be instruction 909). The possible branch targets, in the context of the discussed example are illustrated in FIG. 9 by thick arrows 913.

As it can be recognized by those skilled in the art, larger branches (steps) in the software code of the target fragment shading processor are desirable, since larger branches will lead to larger number of eliminated (not executed) instructions, hence to higher electrical power savings.

If case of a value cache miss, all the instructions comprising the said PSCS must be re-executed (as it will normally happen in a system without the technology provided in this application). In such a case, the VCFU must also notify the processor control flow logic 1014 that no instruction bypassing actions will be performed.

Again, a critical design parameter of the value cache storage area is the number of value cache entries. The applicants have recognized that, even in the case of the dynamic value cache, a relatively limited number of entries is required. However, as it can be understood by those skilled in art, the exact number of entries is a subject under optimization (e.g., via profiling) and should be identified after considering various parameters such as, but not limited, to the occurrences and types of the value cache hits, the electrical power consumed by the value cache, and the electric power consumed by the said PSCS.

The applicants want to clarify that the specific arrangement of the dynamic value cache illustrated in FIG. 10 is not only applicable for the PSCS shown in FIG. 9, but it can be used, as it is, for all the PSCS that have the same number of input parameters, the same number of intermediate results, and the same number of output parameters.

Similarly to the previous example, the target software program may be analyzed to determine all the PSCS that have the same number of input, intermediate result, and output parameters with the discussed PSCS. In a preferred embodiment, this analysis may be performed by traversing the control flow graph of the target software program in order to identify groups of instructions (i.e., PSCS) with the said number of parameters. Those skilled in the art will recognize that it is desirable the sought groups of instructions to include the maximum possible number of machine level instructions, so as the benefits of the value reuse mechanism will be maximized.

Thus, in the case of the dynamic value cache organization illustrated in FIG. 10, the desired groups of instructions must adhere to two conditions. First, the number of the input, intermediate, and output parameter must be as discussed and the sought PSCS must include the maximum possible number of machine level instructions.

In another preferred embodiment, the said analysis may be performed by traversing an intermediate representation or any kind of flow representation of the target software application. In a yet another preferred embodiment, this analysis may be performed statically. Static analysis may be done during the compilation of the target software application or by any kind of tool or tools that may analyze a representation of the software code prior to execution. In a yet another preferred embodiment, the said analysis may be performed dynamically in a just in time or instrumented environment in which a just in time compiler may take into account the said two conditions and accordingly modify the intermediate or executable code at run-time.

As it can be recognized by those skilled in the art, the invented dynamic VCFU may add time and electrical power consumption overheads. The overheads may include testing and retrieving the results from the value cache prior to executing the target PSCS (during the execution of the LookupEntries instruction) plus the overheads of storing the results (during the execution of the AddEntries instruction). Namely, the potential benefits of the proposed VCFU not only depend on the number of instruction instances it has eliminated, but, inter alia, on the time and electrical power spent in detecting the instances to be eliminated and updating the value cache storage area.

Similarly to the previous example, each machine level instruction of the discussed example is assigned with a particular energy token 914. The said energy tokens may be collected and expressed in any suitable way as discussed in the description of the previous example. The applicants want again to clarify that the disclosed technique is independent on the way by which the per-instruction energy tokens have been calculated and/or expressed and the present application intends to include all the equivalent or alternative ways for measuring and expressing the energy consumed by the machine level instructions of the target fragment shading program.

As illustrated in FIG. 9, every instruction consisting the discussed PSCS and the value cache management instructions are associated by a measured or calculated energy token. In case of a type 1 value cache hit, only the energy token (ET1) will be consumed by the target shading processor (the subsequent six instructions will be bypassed or not executed in this case). In case of a type 2 value cache hit, the total energy consumed by the target shading processor will be defined by the addition of the following energy tokens: ET1 plus ET4 plus ET5 plus ET6 plus ET7. In case of a type 3 value cache hit, the total energy consumed by the target shading processor will be defined by the addition of the following energy tokens: ET1 plus ET3 plus ET4 plus ET5 plus ET6 plus ET7.

In case of a value cache miss, the total energy consumed by the target shading processor will be defined by the addition of all the energy tokens depicted in FIG. 9. That is: ET1 plus ET2 plus ET3 plus ET4 plus ET5 plus ET6 plus ET7.

After determining the additive energy tokens for each possible branching operation in the discussed PSCS (that is, the additive energy tokens for a type 1 hit, for a type 2 hit, for a type 3 hit, and for a miss), the next steps may be to calculate specific threshold values. The said threshold values will indicate under which conditions the proposed value cache mechanism can reduce the electrical power consumption for the discussed PSCS. However, a main difference with the previous example is that three threshold values must be determined: one threshold value for each discussed branching operation.

The applicants want to state that the process of calculating the three thresholds and extract the corresponding inequalities is fairly similar to the process discussed in the description of the previous example, so it not necessary to a complete understanding of the present dynamic value cache. Thereby, the applicants desire to not analyze this process.

Furthermore, the applicants want also to state that the methods and apparatus for assessing the paybacks reported by each identified PSCS when employing the proposed dynamic value reuse mechanism are also fairly similar to the methods and apparatus discussed in the description of the previous example, so it not necessary to a complete understanding of the present dynamic value cache. Thereby, the applicants desire also to not analyze the said methods and apparatus.

In addition, the applicants want also to state that those skilled in the art will recognize that the discussed PSCS shown in FIG. 9 and the corresponding arrangement of the dynamic value cache shown in FIG. 10 have been chosen only for illustration and description purposes. Other dynamic value cache arrangements are also possible to be employed and the present application intends to encompass all the alternative arrangements, such as a dynamic value cache with a smaller or larger number of input parameters, or a dynamic value cache with a smaller or larger number of intermediate parameters, and/or a dynamic value cache with larger number of output result fields, and/or an identified PSCS consisting of smaller or a larger number of machine-level instructions.

The applicants want also to clarify that the foregoing description of the subject matter is not intended to be exhaustive or to limit the subject matter to the precise form disclosed, and other modifications and variations may be possible in light of the above teachings. The presented exemplary cases and embodiments were chosen and described in order to best explain the principles of the invention and its practical application to thereby enable others skilled in the art to best utilize the invention in various other embodiments and various modifications as are suited to the particular use contemplated. It is intended that the appended claims be construed to include other alternative embodiments except insofar as limited by the prior art.

What is claimed is:

1. In an instruction set computer, a device, which is part of a processing path of the instruction set computer, to perform memorization to predict results of code segments without executing the code segments, the device comprising:
means for receiving dedicated value cache machine instructions at a start and end of each of a plurality of code segments;
means for receiving arguments associated with each of the plurality of code segments;
means for storing a most recently received N arguments and M results associated with each of the plurality of code segments, wherein N and M are positive integers;
means for storing one or more expected branch offsets for each of the plurality of code segments;
means for searching for a set of input parameters within the means for storing;
means for notifying of a cache hit when the set of input parameters matches the stored arguments associated with a particular one of the plurality of code segments stored in the means for storing;
means for returning the results associated with the particular one of the plurality of code segments;
means for altering an instruction flow to branch to one of the one or more expected branch offsets associated with the particular one of the plurality of code segments; and
means for updating the means for storing when the set of input parameters does not match any of the stored arguments.

2. The device of claim 1, wherein the input parameters are in a floating point format.

3. The device of claim 1, wherein the input parameters are in a fixed point format.

4. The device of claim 1, wherein matching of the input parameters to the stored arguments can be performed using a reduced precision than that of the input parameters.

5. The device of claim 1, wherein the input parameters are commutative.

6. The device of claim 1, wherein the input parameters can be transformed to a sign-independent format.

7. The device of claim 1, wherein the one or more expected branch offsets comprises a plurality of branch offsets, and wherein one of the plurality of branch offsets is selected based on a partial matching of the input parameters to the stored arguments.

8. The device of claim 1 incorporated into a graphics processing unit vertex, fragment, or unified shader processor.

9. The device of claim 1 incorporated into a general purpose processor.

10. The device of claim 1, wherein performance and a cache hit ratio are monitored by circuitry.

11. An apparatus comprising the device of claim 1, wherein the apparatus:
monitors a cache hit rate of the device; and
enables or disables the device based on the cache hit rate.

12. A value caching method in an instruction set computer, the method comprising:
searching computer code and identifying independent code segments having specific input parameters and results;
inserting dedicated value cache machine instructions at a start and end of each of the identified independent code segments, wherein the value cache machine instruction at the end of each of the identified independent code segments updates a value cache;
receiving a value cache machine instruction associated with a particular code segment, the received value cache machine instruction including input parameters;
searching the value cache based on the input parameters, wherein the value cache stores one or more arguments, one or more outputs, and one or more branch offsets associated with each of a plurality of code segments;
determining a cache hit when the input parameters match the one or more arguments associated with a particular code segment stored in the value cache;
branching to one of the one or more branch offsets associated with the particular code segment when there is a cache hit; and
executing the particular code segment when there is not a cache hit.

13. The method of claim 12, wherein the dedicated value cache machine instructions are inserted and removed based on performance criteria.

14. The method of claim 12, wherein the dedicated value cache machine instructions are inserted and removed based on energy consumption criteria.

15. The method of claim 12, wherein the dedicated value cache machine instructions are inserted and removed based on user-defined criteria.

16. The method of claim 12, wherein the dedicated value cache machine instructions are inserted and removed based on an effect on performance of previous execution of each independent code segment.

17. The method of claim 12, wherein a number of cache hits is dynamically adjusted by reducing a precision required in the determining a match between the input parameters and the stored one or more arguments.

18. The method of claim 12, wherein the computer code includes an indication of commutativity of input parameters.

19. The method of claim 12, wherein the input parameters are transformed to a sign-independent format.

* * * * *